United States Patent
Schiers

(10) Patent No.: US 9,346,319 B2
(45) Date of Patent: May 24, 2016

(54) ADVANCED COMPOSITE RIM HAVING MOLDED IN SPOKE HOLES

(71) Applicant: ENVE Composites, LLC, Ogden, UT (US)

(72) Inventor: Jason Schiers, South Weber, UT (US)

(73) Assignee: ENVE Composites, LLC, Ogden, UT (US)

( * ) Notice: Subject to any disclaimer, the term of this patent is extended or adjusted under 35 U.S.C. 154(b) by 491 days.

(21) Appl. No.: 13/663,726

(22) Filed: Oct. 30, 2012

(65) Prior Publication Data

US 2013/0056136 A1   Mar. 7, 2013

Related U.S. Application Data

(62) Division of application No. 12/210,870, filed on Sep. 15, 2008, now Pat. No. 8,313,155.

(51) Int. Cl.
| | |
|---|---|
| B60B 5/02 | (2006.01) |
| B60B 21/00 | (2006.01) |
| B60B 21/06 | (2006.01) |
| B29C 70/34 | (2006.01) |
| B29C 70/72 | (2006.01) |
| B60B 1/04 | (2006.01) |
| B60B 21/02 | (2006.01) |
| B29K 63/00 | (2006.01) |
| B29K 101/10 | (2006.01) |
| B29K 105/24 | (2006.01) |
| B29K 707/04 | (2006.01) |
| B29L 31/32 | (2006.01) |

(52) U.S. Cl.
CPC ............. *B60B 21/062* (2013.01); *B29C 70/342* (2013.01); *B29C 70/72* (2013.01); *B60B 1/041* (2013.01); *B60B 1/044* (2013.01); *B60B 5/02* (2013.01); *B60B 21/025* (2013.01); *B60B 21/026* (2013.01); *B29K 2063/00* (2013.01); *B29K 2101/10* (2013.01); *B29K 2105/246* (2013.01); *B29K 2707/04* (2013.01); *B29L 2031/32* (2013.01); *Y10T 29/49801* (2015.01); *Y10T 156/10* (2015.01)

(58) Field of Classification Search
CPC ...... B60B 21/062; B29C 70/342; B29C 70/72
USPC .......................................................... 264/258
See application file for complete search history.

(56) References Cited

U.S. PATENT DOCUMENTS

| | | | | |
|---|---|---|---|---|
| 804,617 | A * | 11/1905 | Newton | ........................... 301/58 |
| 1,920,303 | A * | 8/1933 | Grotnes | ........................... 72/327 |
| 3,892,091 | A * | 7/1975 | Hutchins | ........................ 451/356 |
| 4,146,274 | A | 3/1979 | Lejeune | |
| 4,844,552 | A | 7/1989 | Tsygankov et al. | |
| 4,930,843 | A | 6/1990 | Lewis | |
| 4,995,675 | A | 2/1991 | Tsai | |
| 5,061,013 | A | 10/1991 | Hed et al. | |
| 5,252,279 | A * | 10/1993 | Gore et al. | ..................... 264/154 |
| 5,540,485 | A | 7/1996 | Enders | |

(Continued)

*Primary Examiner* — Matthew Daniels
(74) *Attorney, Agent, or Firm* — Woodard, Emhardt, Moriarty, McNett & Henry LLP

(57) ABSTRACT

Embodiments of the present invention comprise a composite rim used in spoked wheels, such as bicycle wheels, having molded-in spoke holes along with a method of fabricating the composite rim. Advantageously, the present invention dramatically improves the bearing and loading strength of prior art composite rims, which drill the spoke holes therein after fabrication of the rim hoop.

41 Claims, 6 Drawing Sheets

(56) References Cited

U.S. PATENT DOCUMENTS

| | | |
|---|---|---|
| 5,549,360 A | 8/1996 | Lipeles |
| 6,183,047 B1 | 2/2001 | Kuhl |
| 6,347,839 B1 * | 2/2002 | Lew et al. ............... 301/95.102 |
| 6,398,313 B1 | 6/2002 | Lew |
| 6,846,047 B2 | 1/2005 | Dietrich |
| 2004/0066085 A1 | 4/2004 | Schiers |
| 2004/0227393 A1 | 11/2004 | Meggiolan |
| 2005/0062337 A1 | 3/2005 | Meggiolan et al. |
| 2006/0197369 A1 | 9/2006 | Chiu et al. |
| 2006/0267397 A1 | 11/2006 | Possarnig et al. |
| 2007/0102992 A1 | 5/2007 | Jager |
| 2007/0200422 A1 | 8/2007 | Davis et al. |

* cited by examiner

ADVANCED COMPOSITE RIM HAVING MOLDED IN SPOKE HOLES

CROSS-REFERENCE TO RELATED APPLICATIONS

This application is a divisional of U.S. patent application Ser. No. 12/210,870 filed Sep. 15, 2008, which is hereby incorporated by reference in its entirety.

FIELDS OF THE INVENTION

The present invention relates to rims that utilize spokes such as but not limited to rims for bicycle wheels.

BACKGROUND

A typical light weight will bicycle wheel comprises a rim, a hub assembly and a plurality of spokes that connect the hub with the rim. This basic design has been in use for well over a century and has proven to be quite successful.

Most bicycle rims are made of a metallic material, such as aluminum, although recently advanced composite materials, which offer very high strength to weight ratios, have begun to become popular on high-end racing bicycles. Advanced composite materials which utilize a combination of high strength reinforcing fibers and a polymeric matrix have strength to weight ratios that far exceed most metallic materials. Accordingly, bicycle rims fabricated from advanced composite materials can be made significantly lighter than comparable metallic rims. Furthermore, the low weights of advanced composite materials, about two thirds the weight of an aluminum alloy, permit the fabrication of rims having a much greater depth to width ratio without incurring a weight penalty. Rims having a large depth to width ratios have been found to be advantageous in reducing aerodynamic drag.

The advanced composite materials most commonly utilized in bicycle rims comprise carbon or graphite fiber reinforced with an epoxy matrix. However, other reinforcing materials may be used, such as but not limited to fiberglass, aramid fiber, and boron fiber. It is further appreciated that the advanced composite material of a rim can comprise more than one type of reinforcing fiber. Further, there are many different types of carbon or graphite fiber having different physical properties that can be utilized in a suitable advanced composite material. Besides epoxy, which is a thermosetting polymer, other suitable thermosetting polymers can be utilized as well as thermoplastic polymers. Like carbon fiber, there are also a wide variety of different epoxy polymers that can be utilized.

Typically, advanced composite rims are comprised of what is known in the art as a laminate. A laminate comprises a plurality of relatively thin plies. Each ply comprises reinforcing fiber or fabric comprised of the reinforcing fiber oriented in a particular fashion. If the fibers of a ply are impregnated with semi-cured epoxy (or other polymeric resin), the ply is typically referred to as prepreg. One common form of prepreg often used to produce a wheel rim laminate has the fibers oriented unidirectionally.

To produce a laminate various plies are laid one on top of the other with the relative orientations of fibers of each ply potentially varying relative to the orientation of the fibers of other plies. Since reinforcing fibers exhibit most of their strength in the axial direction versus their transverse direction, the resultant properties of the laminate can be varied and tailored to a specific application.

Next, the laminate, or plurality of laminates, is placed within a mold that approximates the shape of the bicycle rim. The mold is then usually heated and pressure is applied to the laminate to compact the various plies together and minimize or eliminate any voids, or air pockets, existing within the polymeric matrix. One common method of applying pressure is to inflate a bladder that has been placed inside the typically tubular laminate in such a matter that it compresses the laminate up against the walls of the mold. The temperature, time and pressure utilized to cure the polymeric resin will very with the particular resin chosen but temperatures of 200° F. to 350° F. are most common for epoxies. Cure often requires one to four hours depending on the amount of time required to heat the mold up to a desired temperature. Pressures are typically in excess of 50 psi and more preferably 90 psi to 150 psi for most epoxy materials. The resulting cured laminate will comprise approximately 60 to 75% fibers by weight with the remainder comprising the matrix resin.

It is to be appreciated the foregoing is only one methodology utilized to produce a composite bicycle rim. For instance, some manufacturers substitute expandable foam to provide pressure. The foam upon its cure typically becomes a structural element of the rim; whereas, the bladder may be removed from the rim's interior. In other methodologies, expandable elastomers, such as silicone rubber, can be utilized to provide pressure. Furthermore, a rim need not be produced as a single piece. It can be produced as to clamshell halves that are subsequently bonded together, or it can be produced as arcuate sections that are subsequently joined to form a hoop.

After the rim hoop has been cured and formed, spoke holes are drilled into the inner apex thereof. The number of holes is dependent upon the desired number of spokes that will be used to build a wheel. The common numbers of spoke holes typically utilized in a bicycle wheel include 16, 18, 20, 24, 28 and 32. In conjunction with the spoke holes, nipple access holes are drilled in the outwardly facing side of the rim through which a wheel builder can access and tighten the threaded nipples into which the threaded ends of the spokes are received.

Once a wheel is built, the end of each nipple rests and is it tensioned against the edge of a spoke hole. Because the spoke hole is drilled, its edge comprises a plurality of discontinuous fiber ends encased in a polymeric matrix, such as epoxy. Further, the process of drilling a spoke hole causes the matrix material in the region of the spoke hole's edge to form micro cracks, which can, if overstressed, propagate and potentially cause the failure of the rim at this location. Essentially, drilled spoke holes accentuate one of the primary weaknesses of advanced composite materials: their inability to withstand concentrated and localized loading. By cutting the continuous fibers at the edges of the spoke holes during drilling each fiber behaves more like a cantilevered beam rather than a suspended beam. All things being equal, cantilevered beams can withstand much less force than a suspended beam. Further, the micro cracking in the matrix causes stress concentrations as the load or force is transferred between reinforcing fibers. These stress concentrations can cause the micro cracks to propagate and cause a condition known as delamination in the area surrounding the spoke hole significantly weakening the structure.

The problems associated with the drilled spoke holes are typically not a concern in relation to the nipple access holes that are located directly opposite the spoke holes through the top end or tire bed of the rim. This is because, unlike the spoke holes, the nipple access holes are relatively unstressed and are not subject to localized point loading.

To combat the spoke hole problem, composite rim manufacturers add additional plies of material in the region of the spoke holes to increase the rim's bearing strength. This, of course, increases the overall weight of the rim. However, increasing the number of plies or thickness of the rim in the spoke hole region does not prevent the creation of micro cracking during drilling. Accordingly, it is not unheard of for these types of rims with extra reinforcing to eventually fail as micro cracks grow and form strength-robbing delaminations. In short, additional reinforcement does mitigate the drilled spoke hole problem somewhat and accordingly extend the life of the rim, but it is not eliminate the problem.

Another problem associated with composite rims is braking. In road bikes, brake calipers are utilized that force friction inducing pads against the sidewalls of a rim. The friction between the pads and the rim facilitate the deceleration of the associated bicycle. Commonly utilized carbon fiber epoxy advanced composite materials tend to have coefficients of friction that are lower than those of metals, such as aluminum. Accordingly, for a given application of braking force the stopping power of an advanced composite rim is reduced relative to an aluminum rim.

The braking surface of a typical advanced composite rim is formed during fabrication as the sides of the rim are pressed against the surface of the fabrication tool. Accordingly, the surface texture of the resultant rim typically matches the surface texture of the tool. Since most tools are comprised of metal, such as aluminum or steel, and are produced through the processes of machining, the braking surfaces of the rims tend to have a machined finish which comprises a multitude of very fine undulating peaks and valleys. Such a surface effectively reduces the contact area of the braking surface with a brake pad during use as initial contact between a brake pad and the braking surface occurs only at the peaks. As can be appreciated, the reduced effective braking surface area acts to reduce braking efficiency even further.

To ensure a smoother braking surface, some composite rim manufacturers will polish the surfaces of the tool that correspond to a rim's braking surfaces. Polishing is typically performed using abrasive grit paper and/or abrasive polishes that are applied by hand or with the assistance of handheld power tools. While polishing does on a localized scale remove the fine undulations, it can introduce macro undulations over the braking surface. While the magnitude of the undulations may only be thousands of an inch, it can effectively reduce the consistent application braking force and consequently reduce braking efficiency.

DETAILED DESCRIPTION

Figure 1:
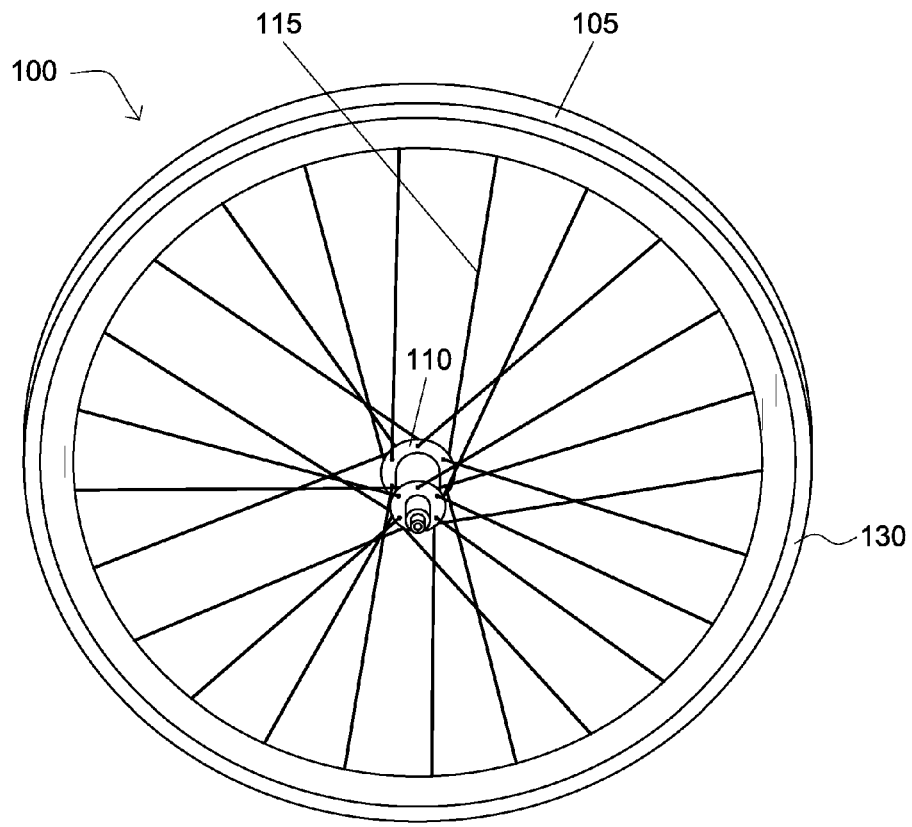
FIG. 1 is an illustration of a spoked bicycle wheel utilizing a composite rim according to an embodiment of the present invention.

Embodiments of the present invention comprise a composite rim for used in spoked wheels, such as bicycle wheels but including other types of spoked wheels as well, having molded-in spoke holes along with a method of fabricating the composite rim. Advantageously, the bearing and loading strength of the rim is improved over prior art composite rims wherein the spoke holes are drilled therein after fabrication of the rim hoop.

By molding in the spoke holes prior to the cure of a thermoset matrix, substantially all of the continuous fibers in the region of the spoke hole remain continuous rather than cut or broken as with prior art post cure spoke hole formation processes. Fibers are urged to extend around the edge of an associated spoke hole thereby minimizing if not eliminating any strength reduction of the rim associated with the spoke holes. A similar process can be applied to thermoplastic matrix materials prior to the melting and encapsulation of the fibers. Effectively, the continuous fibers resist loading in much the same manner as a suspended beam loaded proximate their midpoints as opposed to a cantilevered beam in the case of a cut spoke hole.

The interior surface of the molded-in spoke holes in certain embodiments is fabricated to provide a smooth and uniform surface against which the end of a spoke nipple rests or bears. Accordingly, the tension load of the spoke is more evenly distributed over the interior surface of the rim surrounding the spoke hole. In at least one embodiment, the surface surrounding each spoke hole is substantially flat. In other variations the surface is conical or convex. The particular shape of the surface is configured to correspond with an end surface of an associated spoke nipple.

In contrast, the interior surface surrounding a drilled prior art spoke hole is generally not particularly uniform depending on the shape of the external rim mold, the uniformity of pressure applied during cure and the amount of movement of the carbon fiber and epoxy during cure. Typically, the shape of the interior surface is u-shaped laterally as viewed in cross section and convexly curved circumferentially. The lack of surface uniformity can cause greater point loading and during the tightening of the nipple during wheel fabrication high spots on the interior surface can become damaged including matrix cracking that can facilitate eventual premature failure of the rim.

As indicated above it is often difficult to fabricate a braking surface that is perfectly planar. For instance, the tooling surfaces typically have a small amount of planarity variation that is transferred to the braking surface during cure. Further, residual stresses present in the cured laminate may slightly negatively affect the localized planarity of the braking surfaces. While such small variations are typically not problematic on metallic braking surfaces, since braking surfaces on composite rims already have a low coefficient of friction compared to aluminum, any planarity variations on composite surfaces act to further reduce braking effectiveness. Accordingly, the minimization of planarity variations in a composite rim's braking surface is highly desirable.

Certain rim embodiments are fabricated with a slightly raised flat planar braking surface on each side of the rim proximate an outer edge thereof. The laminate corresponding to these surfaces may also be thicker than in other areas. The raised surface permits a fabricator to quickly and easily abrade the braking by moving the rim in a direction parallel to the flat surface of a surface table while the braking surface is held in contact with a fine grit abrasive paper that has been secured to a flat surface. Because the braking surfaces are raised relative to other surface portions of the rims side surface, the abrading operation does not contact and thereby negatively affect the other surface portions. As a result of the abrading operation, the planarity of the braking surfaces are improved thereby improving the braking performance of the associated rim.

TERMINOLOGY

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase. The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. Concerning angular measurements, "about" or "generally" refers to +−10 degrees and "substantially" refers to +−5.0 degrees unless otherwise indicated. It is to be appreciated that not all uses of the above terms are quantifiable such that the referenced ranges can be applied.

A "composite material" as used herein refers to any material comprising a fiber reinforcement and an encapsulating matrix. Most typically, especially in reference to the present invention, the matrix will comprise a polymeric material.

An "advanced composite material" as the term is used herein is the same as that commonly known in the industry and refers to a composite material consisting of a polymer matrix reinforced with primarily high-strength continuous fibers of predefined orientation(s). A fiber (a fiber or fiber tow typically comprises a bundle of filaments) is generally considered to be continuous if the fiber extends from one edge of a ply of material to another edge, most often the opposing edge. While all fibers in an "advanced composite material" need not be continuous for the material to be an "advanced composite" as opposed to a mere composite material, the substantial majority of the fibers will be continuous.

"Prepreg" as used herein refers to a ply of composite material comprising one or more types of reinforcing fiber at least partially impregnated and/or encapsulated with a resin. When the resin is a thermoset, the resin is not fully cured and typically requires the application of heat to complete cure. When the resin is a thermoplastic, the resin is typically a solid that melts and flows under the application of heat and pressure to further encapsulate the fibers as well as join adjacent plies of material together.

A "ply" as used herein comprises a single layer of high strength continuous fibers aligned in a common orientation, or in the case of a fabric in two and possibly three or four orientations. One of the most common plies utilized in advanced composite materials is wherein substantially all the fibers in the ply are aligned in a single direction. A "ply" may also be referred to as a layer. A ply can comprise a prepreg or it can comprise a single sheet of dry fabric or dry sheet of unidirectional fibers often held together with a small number of bias threads or fibers.

A "laminate" comprises a plurality of plies that have been stacked (or laid) one on top of another. As used herein the term refers to both the plurality of plies before cure and/or consolidation, as well as after consolidation as is apparent from the term's use in context. The orientations of the fibers of each particular layer may vary relative to the orientations of the fibers in other layers to create a consolidated laminate having desired strength and stiffness characteristics in various directions. By utilizing and tailoring plies with differently orientated fibers, a composite material's designer or engineer can tailor the mechanical properties of an advanced composite laminate to withstand the forces that the laminate is likely to encounter during use.

"in situ" as used herein means in place or in the original place. As used herein in reference to the formation of a bicycle rim, "in situ" means that the referenced feature or element is formed in place during the formation (consolidation and/or cure) of the rim as opposed to in a subsequent manufacturing operation.

The terms "nipple", "spoke" "rim" and "hub" have their ordinary meaning relative to their use in wheels in general and bicycle wheels in particular.

Figure 2:
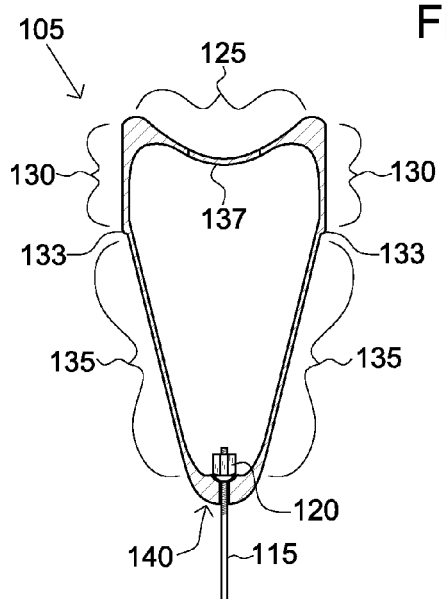
FIG. 2 is an illustration of a partial cross section of the spoked bicycle wheel of FIG. 1 illustrating a spoke received through a molded-in spoke hole and secured by a nipple resting on a concave ledge formed surrounding the hole according to an embodiment of the present invention.

An Advanced Composite Rim Having Molded-in Spoke Holes and a Wheel Incorporating the Rim According to Embodiments FIG. 1 is an illustration of a bicycle wheel 100 utilizing an advanced composite rim according to one embodiment of the present invention. The wheel comprises: the composite rim 105; a hub 110 by which the wheel is rotatably secured to a bicycle frame or fork; and a plurality of spokes 115 which span between the hub and an inside circumferential edge of the rim to transfer load therebetween and provide the rim with support. As shown in FIG. 2, threaded nipples 120 are provided that interface with corresponding threaded distal ends of the spokes to secure the spokes to the rim under tension.

The rim 105 is comprised of an advanced composite material typically comprising high strength carbon fiber reinforcement and an epoxy matrix. In certain variations, a small amount of lightweight cloth comprised of fiberglass can also be used to help ensure that certain surfaces are smooth and uniform. The advanced composite material is typically provided as prepreg comprising thin layers of unidirectional continuous carbon fibers held together by a partially cured epoxy resin. The various layers (or plies) are stacked one upon another to form laminates. The laminates are then arranged to form the rim as discussed in greater detail below.

The orientation of the carbon fibers in the laminates relative to the circumferential direction of the rim largely determine the mechanical properties of the rim relative to different types of loading. For instance, layers of fibers that extend in a generally circumferential direction are largely responsible for the hoop strength of the rim; whereas, fibers that extend in a radial direction or at an acute angle relative to the circumferential direction add rigidity and structural integrity to the rim. Ultimately, each laminate comprises a plurality of plies that have varying angles that provide the desired strength and stiffness.

Typically, carbon fiber having tensile modulus of 30 million pounds per square inch (PSI) or greater are utilized as the primary reinforcing fiber but other high strength fibers made from boron, glass, aramid, liquid crystal polymer and other materials can be utilized as well either alone or in combination with carbon fiber. Further, different types of carbon fiber can be mixed to create a single rim.

Epoxy resin is most typically used as a reinforcing matrix medium. In those embodiments and variations comprising consolidated prepreg laminates. The epoxy resin is typically heat cured wherein the rim is heated to about 250 degrees Fahrenheit and held at the elevated temperature for a predetermined to cause the resin to first liquefy and flow and then cross link and solidify into a uniform and substantially homogeneous matrix. Epoxy resins having different resulting properties can be used in variations depending on the desired characteristics of the finished and cured rim. Other resins can be substituted for epoxy such as but not limited to polyester and bismaleimide. Further, thermoplastic resins can be utilized, such as but not limited to nylon, which melt upon the application of heat causing the melt from various plies to homogenize when sufficient pressure is applied.

The actual reinforcing fibers, matrix resins, as well as, the configuration and orientations of the various layers or plies are often determined by the intended use of the rim and/or its structural configuration. Suffice it to say that the novel aspects of the various embodiments described herein can be utilized with composite rims comprising a number of different materials manufactured using a number of different means as is evident to someone of ordinary skill who has been given the benefit of this disclosure.

The cross sectional shape of the various embodiments of the rim can vary substantially and significantly. However, most typically composite rims have a relatively voluminous cross sectional area at least when compared to aluminum rims having generally similar weights. The large cross sectional areas usually serve two purposes: (i) the resulting structures are often substantially stiffer than aluminum counterparts; and (ii) the shapes of the cross section can be configured to maximize the aerodynamic efficiency of the rim.

Research into the aerodynamics of bicycle wheels has determined that v or u shaped rims, such as is illustrated in cross section in FIG. 2, have superior aerodynamic properties compared to traditional box shaped rims. The aerodynamic advantage is most pronounced when the ratio of the rim's depth to width exceeds 1 or more. Ratios of about 2-3 have been found to offer good aerodynamic properties but at the same time are not overly sensitive to cross winds that could negatively impact steering.

Referring to FIG. 2, a typical embodiment of a rim 105 is narrowest at its inwardly-facing circumferential end portion 140 wherein it interfaces and is coupled with the wheel's spokes 115 by threaded nipples 120. From the inwardly-facing end portion, left and right sidewall portions 135 extend upwardly and laterally outwardly. As shown in FIG. 2, the sidewall portions are substantially straight and linear but depending on the particular rim they can be convexly or even concavely shaped. The sidewall portions intersect with the substantially vertically orientated and substantially parallel left and right braking surface portions 130 at their distal ends. The rim is typically widest between the brake surface portions and includes a flat outer surface adapted to resist flex when brake pads are driven against the surfaces through the application of a bicycle's brake caliper. To help minimize flex, the braking surface sidewall portions are often thicker than the sidewall portions 135. Extending between the top edges of the braking surface portions is a top side 125 that is typically concave forming a channel in which to receive a bicycle tire (not shown).

The illustrated rim 105 is configured for use with tubular racing tires also known as sew-ups. An adhesive, typically tape or glue, is applied to the concave surface of the top side portion 125 onto which the tubular tire is seated to secure the tire in place. Tubular tires and compatible wheels are typically used on high end road bicycles often by road cyclists who compete in races or desire to have the lightest possible bicycle; whereas, clincher tires and compatible wheels are the more common combination. Although not illustrated, rims designed and adapted for clincher tires are contemplated herein. The novel aspects of the described embodiments are equally applicable to clincher compatible rims notwithstanding the differences in the design between clincher and tubular compatible rims.

While composite rims typically have aerodynamic cross sections as illustrated and described herein, rims with traditional box section shapes and other shapes are contemplated as well. For instance, on mountain bicycles a rim with a boxier and less aerodynamic shape may be desirable because the need to maximize the rim for strength, stiffness and/or weight outweighs the need for aerodynamics.

As indicated above, the left and right braking surface portions 130 are each flat and planar, as well as being substantially parallel to each other. Given the nature of composite rim manufacture, it is often difficult to produce a rim that has braking surfaces that are near perfectly flat. Any undulations and/or machining marks from the typically metallic tooling are often transferred to the braking surfaces. Further, unavoidable localized variations in the angular orientations of the fibers in various plies relative to other plies can induce localized stresses that pull the surfaces slightly out of plane. These deviations from a perfectly or nearly perfect planar surface are minor and often not easily ascertained through visual inspection with a naked eye; however, such variations can have a significant negative effect on braking performance by reducing the contact patch between the brake pads and the braking surfaces.

To ensure the best possible planarity of the braking surface portions 130, the intersection of the braking surface portions with the left and right sidewalls juts laterally outwardly to form a lip 133 or ledge. Effectively, the braking surface portions are raised above the sidewall portions rather than there being a smooth transition between the respective portions. As mentioned above, the extra thickness and raised nature of the braking surface allows a fabricator to quickly and easily abrade the surfaces and smooth out any irregularities in planarity without compromising the structural integrity of the rim.

Figure 11:
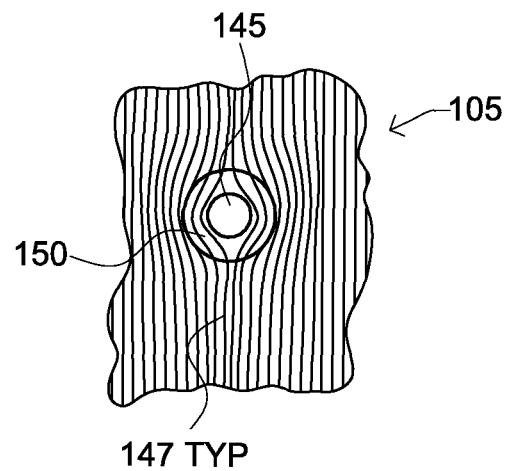
FIG. 11 is a demonstrative illustration of a molded in spoke hole showing the continued continuity of the reinforcing fiber surrounding the spoke hole according to an embodiment of the present invention.

The end portion 140 includes a plurality of spoke holes 145 evenly spaced and distributed around its entirety. The number of holes correspond to the number of spokes 115 that will extend between the rim and the hub when the rim is incorporated into a wheel. The spoke holes are each molded into the end portion in situ as opposed to being mechanically formed in a post cure drilling operation. Accordingly and advantageously as illustrated in FIG. 11, the continuity of the fibers 147 immediately adjacent the spokes holes is not broken allowing these fibers to effectively transfer load incurred during the wheel's use more effectively around the spoke hole.

Figure 12:
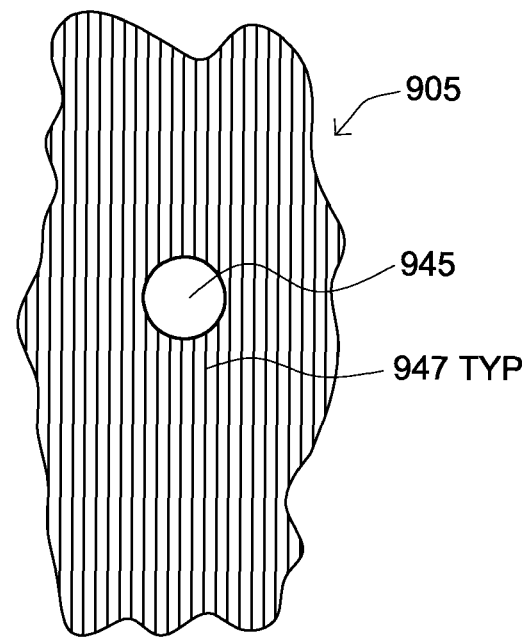
FIG. 12 is a demonstrative illustration of a prior art spoke hole as drilled in a prior art advanced composite bicycle rim showing the reinforcing fiber discontinuities introduced surrounding the spoke hole.

In contrast, when the holes 945 are mechanically formed such as by drilling as illustrated in the section of a prior art rim 905 in FIG. 12, the fibers 947 are broken and are unable to transfer load directly across the hole. Rather a stress concentration is created wherein the load must be transferred around the hole by way in part by transferring load to the matrix in shear and distributing the load to other continuous and discontinuous fibers of the laminate. These stress concentrations cause an increase in the micro-cracking of the matrix resin which over time causes the matrix in the region of the spoke holes to loose it ability to transfer load among fibers ultimately leading to a failure, such as the irregular enlargement of the hole and the associated nipple being pulled partially or wholly therethrough.

Explained another way, the continuous fibers 147 extending adjacent the spoke hole opening 145 behave generally like a simply supported beam in its ability to carry bearing load. The fibers are supported on either side of the hole and the bearing load from the nipple, which transfers the tension in the spoke to the rim, is applied to the fiber between the supported ends. In contrast, loading behavior of the discontinuous fibers 947 in a drilled spoke hole 945 is analogous to that of a cantilevered beam. As is well known in engineering mechanics, a supported beam can carry 4 times the load as a cantilevered beam making the in situ molded spoke holes much stronger than post cured drilled spoke holes known in the prior art.

Figure 3:
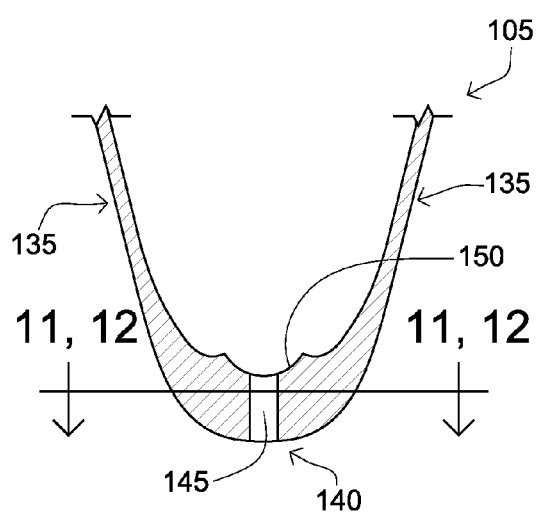
FIG. 3 is a close-up cross sectional illustration of a molded-in spoke hole according to an embodiment of the present invention.

Referring to FIGS. 2 and 3 it is noted that the bottom ends of the spoke nipples 120 are rounded or convex. The spoke hole is likewise molded with a concave depression 150 surrounding the hole. The depression is configured to match and/or compliment the curvature of the nipple's bottom end. The concave depression permits maximum contact between the nipple and the rim so that the load is transferred evenly around the spoke hole to the rim. As is well know among wheel builders, a spoke does not extend perfectly radially from the spoke hole toward a flange on the associated hub 110. Rather, the spoke also extends laterally outwardly to either the left or the right. The convex/concave nipple/spoke hole interface permits the interface to pivot the small amount required while still maintaining a maximum area of contact to most effectively distribute the load transfer over the largest possible area.

In contrast, the shape of the interior surface of the end portions of prior art rims is often dictated by the media that applies pressure to consolidate the laminate(s) such as an inflatable bladder or expanding foam, as well as, the laminate in this portion of the rim. As a consequence, the interior surface is not particularly uniform. It may be slightly u or v shaped as viewed in a lateral cross section but having a curve in the circumferential direction that essentially matches the radius of the end portion of the rim. As a result of the interior shape, the nipples 120 whether placed concave or flat side down are much more likely to transfer the spokes' loads over much smaller areas resulting in more concentrated point loading of the region of the rim surrounding the prior art spoke holes.

The other components of embodiments of a wheel 100 incorporating embodiments of the composite rim 105 are typically standard components that can be used in other wheels and as such are readily available at many bike shops. Advantageously, placement parts are more easily obtained when compared to some composite wheel fabricators which utilize custom advanced composite spokes and proprietary hubs. While custom advanced composite wheels using proprietary spokes and/or hubs can be made very light, the rider's choice in terms of the configuration of a wheel or wheelset is severely limited.

In at least several of these custom wheels fabricated by several different manufacturers, the spokes are adhesively bonded to the rim to avoid the problem of creating spoke holes that, because of the compressive bearing load of the nipple, can lead to sudden and premature failure of the wheel. However, while this ameliorates the spoke hole loading problem, it creates new issues or problems that render the solution less than ideal. For instance, a failure of a bonded composite spoke renders the entire wheel non-function until it can be returned to the factory for possible repair. In many instances, the wheel cannot be repaired and an expensive replacement will need to be provided. In contrast, if a spoke fails during use on the wheel embodiment illustrated in FIG. 1, any skilled mechanic can easily replace it with spokes and nipples available in a moderately well stocked bicycle shop.

Likewise an entire wheel or wheelset can be built using embodiments of the rim 105 described herein by a moderately skilled wheel builder using similar techniques that he/she would use to build a wheel using an aluminum rim. In contrast, many wheel builders shy away from prior art composite rims for fear that if they tighten the nipples too much that the rim will be damaged.

Unlike most aluminum rims, most advanced composite rims with drilled spoke holes are provided with very specific maximum tension levels for the spokes. If those levels are exceeded the risk of rim failure is significantly increased. Many wheelbuilders have commented that as the spoke tension is increased to suitable levels by tightening an associated nipple during the building of a wheel, the advanced composite rim emits audible pops and cracks presumably in the region surrounding the spoke hole as a result of matrix cracking and microcracking that will ultimately reduce the rim's and the wheel's longevity. In contrast, embodiments of a composite rim 105 having molded in spoke holes wherein substantially all the fibers adjacent the hole are continuous no maximum tension level is specified other than one dictated by the limitations of the spokes 115 rather than the rim.

The rim 105 as shown in FIG. 2 is designed to utilize hidden spoke nipples that are tightened and loosened using wrenches inserted through the top end 125 by way of drilled holes 137 radially aligned with molded in spoke holes 140. Because these access holes are not significantly stressed or loaded during the use of the rim, the fact these holes are drilled does not negatively impact the strength or longevity of the rim. It is to be appreciated that embodiments and variations of the composite rim are contemplated that can be utilized with more traditional nipples that have a portion that extends radially inwardly through the hole to expose wrench flats through which the spokes can be tightened or loosened with a traditional spoke wrench while a tire is glued or otherwise affixed to the rim.

Mold Tooling Used to Fabricate a Composite Rim Having Molded in Spoke Holes

As mentioned above, one method of making a composite rim involves the use of a clamshell type tool or mold 200 in which the rim laminate 105 is enclosed. A bladder 800 (see FIG. 9) is then inflated to press the laminate 105 against the walls of the mold while heat is applied to the mold and the laminate to consolidate the various plies and cure the resin matrix. In some variations of this method an expanding foam is used in place of the bladder to provide the necessary pressure. In embodiments of the method described herein, the mold also serves to facilitate the placement of spoke hole pins 400 (see FIG. 8) into the laminate prior to laminate cure as well as ensure the pins are properly held in the desired position and orientation during cure.

The tooling or mold 200 is best described with reference to an exploded view illustrated in FIG. 4 and a partial close up view provided in FIG. 5. The mold comprises: (i) left and right clam shells 205 & 210; (ii) four top cap pieces 215A-D; and (iii) a plurality of bolts 230 used to secure the various pieces together around the laminate during consolidation and/or cure.

Figure 4:
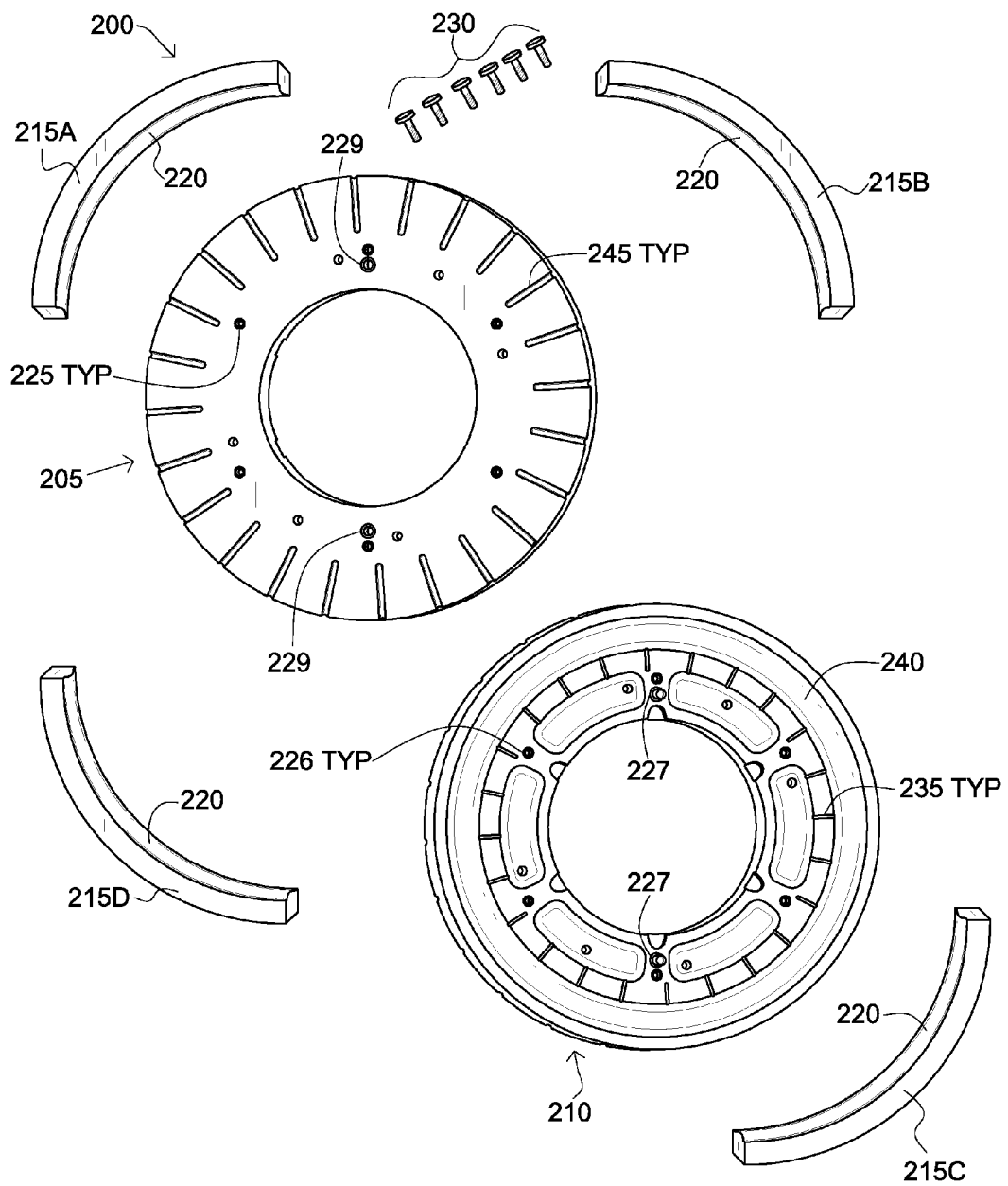
FIG. 4 is an exploded view illustration of tooling utilized to fabricate a composite rim according to an embodiment of the present invention.

As illustrated in FIG. 4, the right clam shell 210 is shown with the interior exposed. It is appreciate that interior of the left clam shell 205 is generally a mirror of the interior of the right clam shell 210. Significant features of each interior side of the clam shells include the a side relief portion 240 against which the laminate is laid and compressed during consolidation and/or cure to form either the left or right sidewall 135 and braking surface portion 130 as well as a respective left or right half of the bottom end 140. The surface of the side relief portion is generally smooth and treated with a mold release prior to use to facilitate both the fabrication of a rim with smooth exterior surfaces and release of a consolidated/cured rim from the mold.

Figure 5:
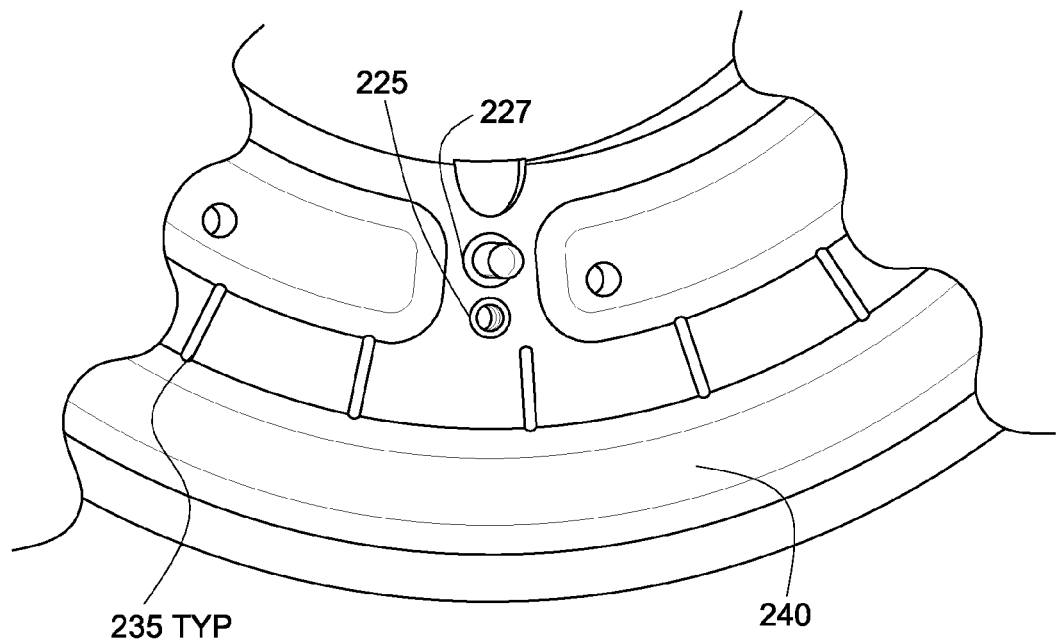
FIG. 5 is a close-up partial view of the interior surface of one side of the clamshell tooling specifically illustrating the spoke pin slots according to an embodiment of the present invention.

From the interior circumferential edge of the side relief portion a plurality of semicircular spoke pin channels 235 extend radially inwardly as best shown in FIG. 5. The channels are evenly spaced with the number of channels depending on the number of spoke holes that are to be provided in a rim fabricated using the mold 200. For instance, a clamshell of a mold used to produce a rim with 16 spoke holes will have 16 channels; whereas, a clamshell of a mold used to produce a rim with 24 spoke holes with have 24 channels. As can be appreciated the semi-circular channels on the right clamshell align with the semi-circular channels on the left clamshell when the halves are joined to form cylindrical channels that guide and retain the spoke hole pins 40 therein. While the channels are typically semi-circular, they can have other shapes in mold variations depending at least in part on the configuration of associated spoke hole pins 400.

Also provided on some molds, but not illustrated for purposes of simplification, is an inwardly extending channel for receipt of a valve stem pin (also not illustrated). The valve stem pin and channels facilitate the formation of a molded valve stem hole in essentially the same manner as the spoke hole channels and pins facilitate the formation of the spoke holes. Since the valve stem hole is not highly stressed and is not subject to significant bearing loads, other variations of the mold do not include valve stem channels and the valve stem hole is formed in the rim in a subsequent drilling operation.

Also extending inwardly from the right clamshell 210 are a pair of opposing alignment pins 227. The pins correspond with a pair of alignment pin holes 229 on the left clamshell 205. The pins and associated holes are used to index and align the right and left clamshells when they are joined together. Of significant note is that the alignment pins and pin holes may be comprised of hardened steel affixed in the otherwise aluminum tooling. To hold the left and right sections together and provide the necessary friction to frictionally hold the cap pieces 215A-C in place, a plurality of threaded bolts 230 pass through the left clamshell and are threadably tightened within corresponding threaded openings 226 in the right clamshell.

The four cap pieces 215A-C are provided to fully encapsulate the laminate and provide a mold surface 220 that corresponds to the top side 125 of the rim. Accordingly the top end mold surface is finished in a manner similar to that of the side relief portions 240. In use, the cap pieces are arranged between the edges of the clamshells and are frictionally secured in place when the various threaded bolts are tightened. While four top cap pieces are illustrated, it is to be appreciated that molds utilizing 2, 3 or even a greater number of cap pieces are contemplated. Further, while the cap pieces as described and illustrated herein are held in place through friction, in other variations the cap pieces can be pinned, bolted or mechanically secured in place by any suitable means.

The exterior side of the left and right clamshells 205 & 210 is illustrated in FIG. 4 by the left clamshell. As shown the exterior includes a plurality of elongated radially-extending semi-circular alignment slots 245 that are typically significantly larger in diameter than the spoke hole channels 235; however, when the clamshells are joined each alignment slot is parallel and circumferentially-aligned with both a corresponding alignment slot on the opposing clamshell and a pair of corresponding spoke hole channels 235. The alignment slots are utilized in conjunction with the spoke hole pin insertion tool 300 to ensure that the pins are interested through the opaque laminate into the cylindrical channels formed by corresponding spoke hole channels.

Figure 8:
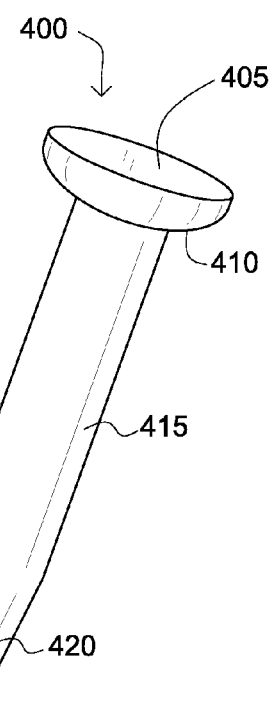
FIG. 8 is an isometric view of a spoke hole pin according to an embodiment of the present invention.

A typical spoke hole pin 400 is illustrated in FIG. 8. As indicated above, the pin is utilized to create a molded in spoke hole 145 having a concave surrounding surface 150 adapted to receive and cradle a convex end of a spoke nipple 120. The spoke hole pin comprises a post 415 intersecting with a head 405 at its proximal end and tapering at its distal end 420. The head is substantially flat on its top side and has a convex underside 410 that presses into the interior surface of the laminate 105 during consolidation and cure to for the concave surface surrounding the associated spoke hole 145.

Figure 6:
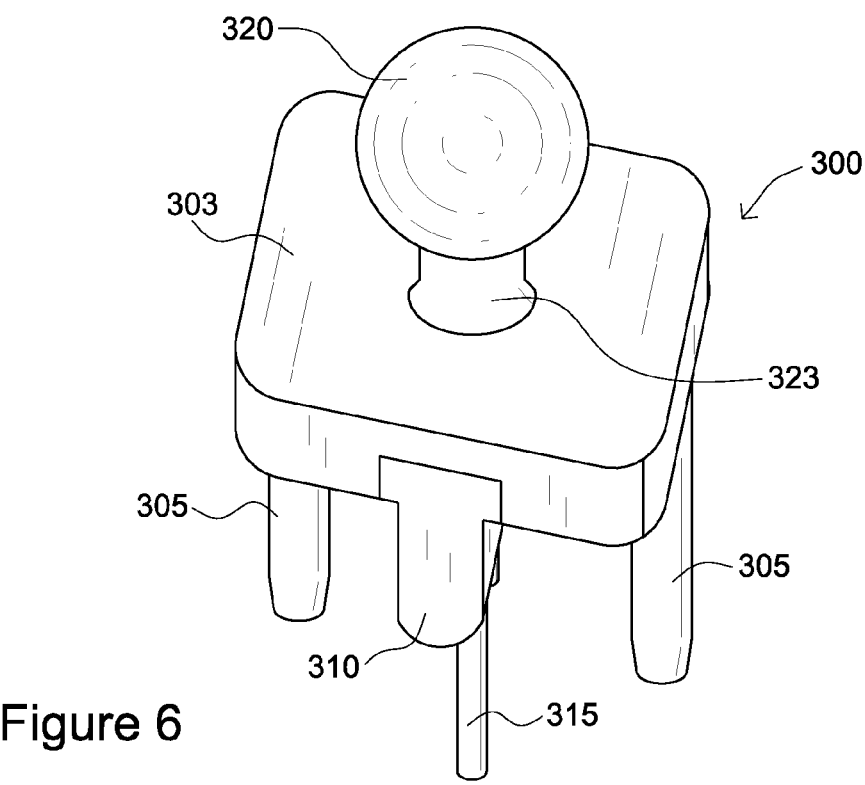
FIG. 6 is an isometric view of the spoke pin insertion tool according to an embodiment of the present invention.

The spoke pin insertion tool 300 is illustrated in FIG. 6. It comprises a generally rectangular body section 303. A generally spherical handle 320 is mounted to a post 323 that extends upwardly from the general center of the top surface of the body section. By wrapping his/her hand 500 around the handle a fabricator can apply leverage and force to the tool to press a pin 400 inserted in the tool through laminate and into the spoke pin cylindrical channels 235. Below the handle on the bottom side is protrusion 310 having a width similar but slightly smaller than the width between the inside surfaces of respective left and right sidewall portions and respective left and right braking surfaces portions of the laminate once it is laid into the tool 200. The length of the protrusion extends substantially along the length of the body. The bottom end of the protrusion is rounded to help facilitate smooth placement into the interior of the joined clamshell mold having a laminate positioned therein. An elongated spoke hole pin shaft 315 sharing a longitudinal axis with the aforementioned handle post extends from the approximate widthwise and lengthwise center of the protrusion. An cylindrical cavity is provided on the distal end of the shaft adapted to receive the head 405 of a spoke hole pin 400.

On either side of the body extending downwardly from the bottom surface thereof are a pair of alignment rods 305. Both rods and the spoke hole pin shaft 315 are linearly aligned in a direction substantially perpendicular to a lengthwise axis of the protrusion 310. Of important note, the spacing between the alignment rods is less than the distance between the exterior sides of the left and right clamshells when they are joined and bolted together. Rather the spacing between the alignment rods is only slightly greater than the distance between each left alignment channel 245 and its corresponding right alignment channel 245. Accordingly with reference to FIG. 7, to insert a spoke hole pin 400 into a laminate that has been laid in the joined clamshells 210, the fabricator must align the alignment rods with a pair of alignment channels 245. Once aligned the fabricator can apply pressure to the tool through the handle 320 causing the tapered end 420 of the pin to pierce the laminate and guide the pin into a corresponding cylindrical channel comprising two aligned semicircular spoke hole channels 235 (see FIG. 9). Since the laminate has not been cured and or consolidated when the spoke hole pins are inserted, the reinforcing fibers proximate the insertion locations move or slide to the side of the pin and do not typically fracture of break thereby maintaining the continuity of the substantial majority of the fibers in the region of the pin and ultimately surrounding the spoke hole 145 formed therearound during consolidation and cure.

A Method of Fabricating the Advanced Composite Rim Having Molded-in Spoke Holes

Figure 7:
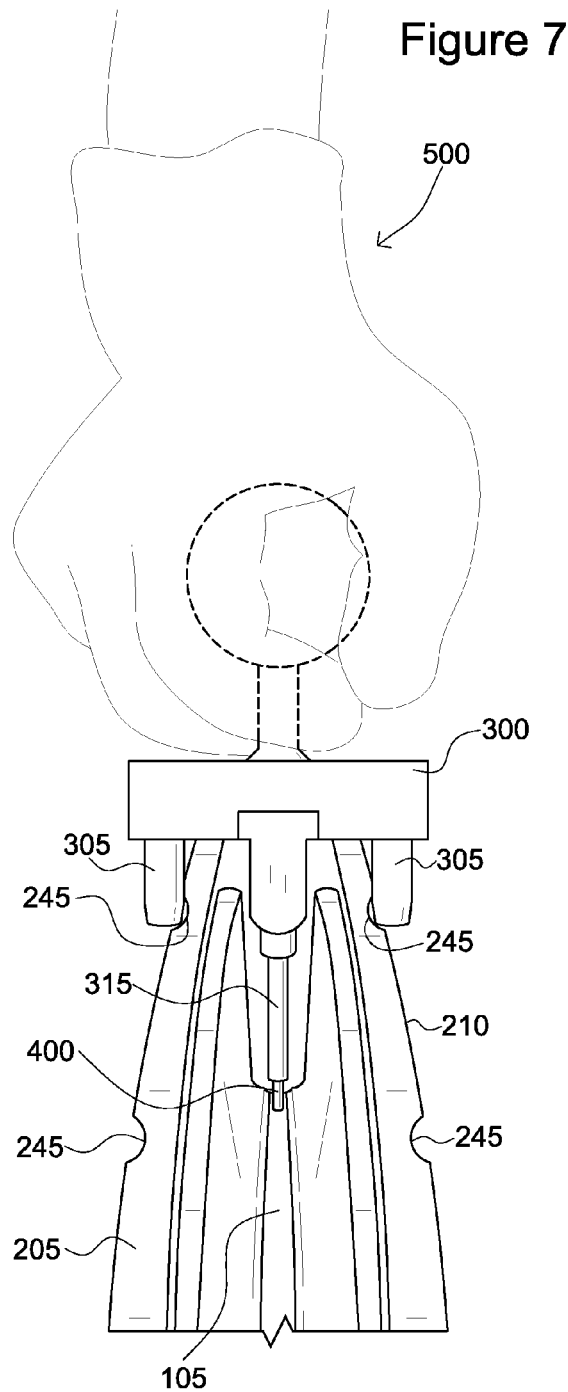
FIG. 7 is an isometric view of the spoke insertion tool being utilized to install a spoke pin through a laminate residing in the assembled clamshell prior to curing according to an embodiment of the present invention.
Figure 9:
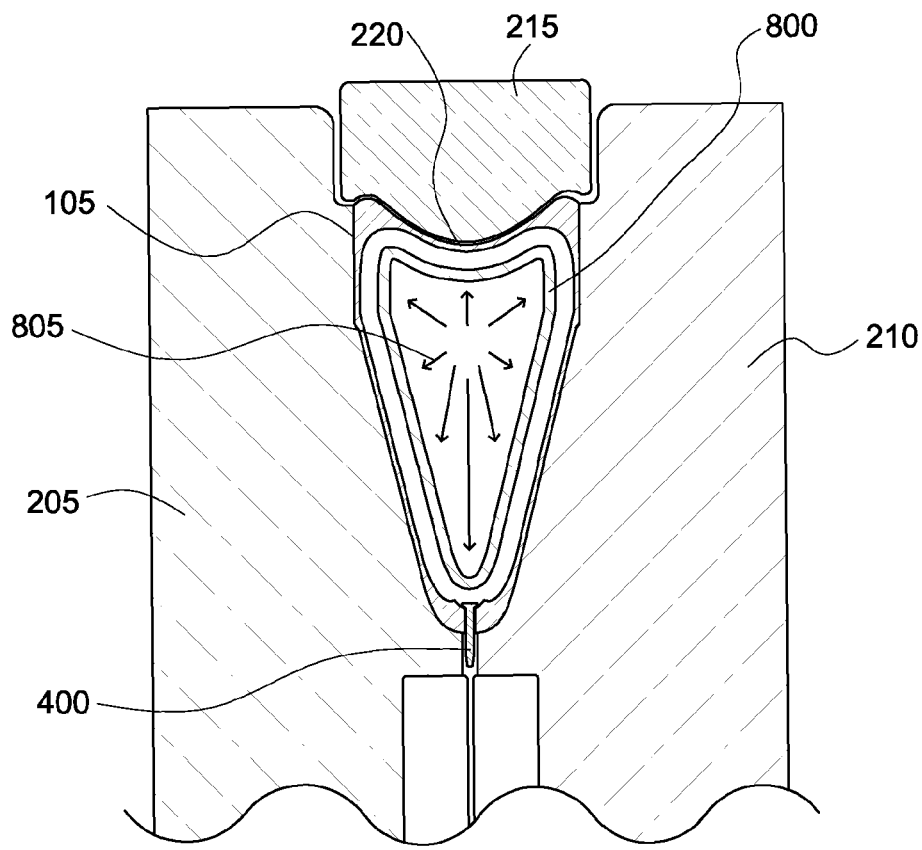
FIG. 9 is a partial cross sectional view of the tooling with the top and base laminates received therein and positioned for cure according to an embodiment of the present invention.
Figure 10:
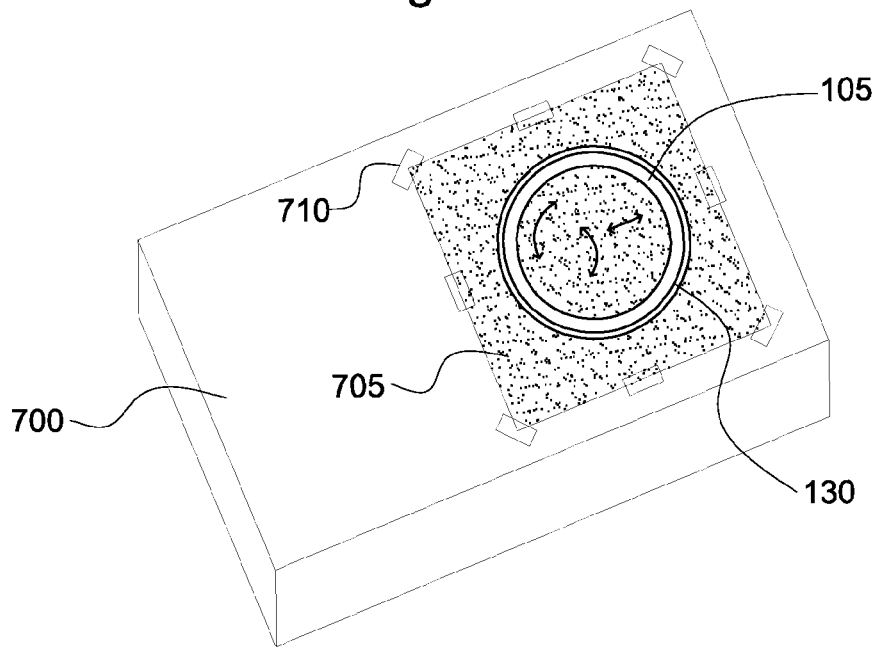
FIG. 10 illustrates the manner in which the braking surfaces of the rim are prepared post cure to ensure uniform planarity according to an embodiment of the present invention.

With reference primarily to FIGS. 7, 9 and 10, a method of fabricating an embodiment of an advanced composite rim 105 having molded in spoke holes 145 is described.

Typically, one of the first steps in creating an advanced composite rim 105 is to create a laminate and/or sublaminates from a variety of plies by stacking them one on top of another with the reinforcing fibers in each ply extending predetermined orientations relative to those in other plies of the laminate. Often the laminate that comprises the rim prior to cure and/or consolidation comprises a plurality of sublaminates that are laid together and orientated relative to each other as they are placed on and/or in the mold. The configuration of the laminate and its various sublaminates and plies can vary depending on the design of the rim, the rims intended use and the properties desired by the fabricator. The actual process of creating a rim laminate is well know to those of ordinary skill in the art and as such need not be discussed herein in great detail.

Prior to placing the various sublaminates in the mold 200, a release agent is applied to the surfaces of the mold that will come into contact with the laminate to prevent the rim from bonding to the mold during cure. Either or both single use and multiple use release coatings can be used.

Initially, the sublaminates comprising the rim's end portion 140, left and right sidewall portions 135 and the braking surface portion are placed or laid in the mold 200. The sublaminates can be placed on the clamshell halves 205 & 210 prior to joining the halves, after joining the halves, or some combination thereof. The top end 125 of the rim is typically formed by a separate set of sublaminates that is laid or placed on the tooling after insertion of the spoke hole pins 400.

Referring to FIG. 7, the fabricator inserts the various spoke hole pins 400 through the laminate 105 in the predetermined locations as dictated by the alignment channels 245 and the spoke hole channels 235 on the mold in the manner described above. As can be appreciated the various alignment features ensure the each pin 400 is properly placed and aligned relative to each other pin and the rim itself. Further, the alignment features on the mold 200 and the spoke pin insertion tool 300 permit a fabricator to insert the pins relatively quickly without having to spend a significant amount of time calculating where to place the spokes. As can be appreciated, the spoke hole pins 400 are typically treated with a release agent prior to use.

After inserting all the spoke hole pins, a bladder 800 is inserted into the mold. The bladder can be comprised of any suitable tubular material that can withstand the necessary cure/consolidation temperatures while containing gas pressurized to between 50-300 psi. Disposable one time use bladders, such as those made of nylon sleeves, can be used as can multiple use bladders made of elastomeric rubber or silicone. In some embodiments, the bladders are left in the rim after cure; whereas, in others the bladders are removed after cure. No matter whether the bladder is to remain in the cured rim or removed, an access port must typically be provided wherethrough the bladder can be pressurized and wherethrough pressure can be maintained throughout cure. An access opening can be provided in any suitable location on the rim but typically is provided though the top end 125 far removed from the end portion 140 that is more highly loaded during use as a result of the spoke/rim interface. It is appreciated that means of configuring bladders to pressurize a composite rim during cure are well known to those of ordinary skill in the art and as such will not be described in greater detail herein.

Once the bladder had been placed in the tooling between the laminate, the sublaminates comprising the top end 125 are laid in place. Of important note is that the top side sublaminates overlap the laminate already placed in the mold in the region of the braking surface portions 130 thereby increasing the laminate's thickness, stiffness and strength in this region. This increased thickness is also important in that it permits the subsequent abrading operation to be performed without concern that the thickness of the braking surface portion at any spot on the rim will become too thin and compromise rim strength and integrity. Either contemporaneously with the placement of the top end sublaminates or immediately thereafter, the top cap pieces 215A-D are installed (see FIG. 9) and, as necessary, the clamshell bolts 230 are further tightened and torqued to secure the top caps in place.

Next, the bladder is pressurized with nitrogen or compressed air 805, typically to 50 to 300 psi depending on the nature of the matrix material to be cured and/or solidified. After checking for leaks, the mold tooling 200 containing the laminate 105 is placed in an oven or a heated press to facilitate either cure of the matrix, such as when the matrix comprises a thermoset polymer, or melting of the matrix, such as when the matrix comprises a thermoplastic polymer. In the case of a typical epoxy matrix resin, the mold is heated to about 250 degrees Fahrenheit and held at that temperature for 1-2 hours before being permitted to cool.

After the mold has cooled, it is disassembled and the rim 105 is removed therefrom. As applicable the bladder 800 is removed from the rim as well as the spoke hole pins 400. As desired, a composite patch may be adhesively bonded over the bladder access opening. Spoke nipple access holes 137 are then typically drilled into the top end 125 of the rim using a suitable tool to ensure proper alignment with the spoke holes 140.

As discussed above, given the nature of advanced composites materials, there is almost always at least some minor variation in the planarity of the rim's braking surface 130. These variations, which can be as little as thousandths of an inch, can have a significant negative impact on the braking performance of a wheel 100 built using the rim 105. Accordingly, the rim is abraded on a flat surface table 700 as indicated in FIG. 10. The surface table is the type commonly available for high tolerance fabrication and measurement. The tables are typically made of an extremely dimensionally stable material such as granite and are honed to be nearly perfectly planar on at least a top side. To the top surface of the table a piece of grit paper 705 is tautly secured, such as with pieces of tape 710 along its edges. The rim's braking surface portions 130 are then brought into contact with the paper moved around the surface of the paper while downwardly pressure is applied. Periodically, the surfaces are checked for planarity and the process continues until the fabricator is satisfied that the braking surfaces portions are suitably planar. Even the removal of only a small amount of material has been found to have a dramatic effect on braking performance.

After completion of the rim, it is ready to be built up into a spoked wheel using traditional and well known methods.

Alternative Embodiments and Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

Of significant note is that although the embodiments described and illustrated herein pertain primarily to advanced composite rims used in bicycle wheels, embodiments are contemplated that could be used with other spoked wheels, such as those on motorcycles in general and motocross motorcycles in particular. Further variations are contemplated that could be used in any type of suitable wheeled vehicle that is capable of utilizing spoked wheels.

What is claimed is:

1. A method of fabricating a rim, comprising:
   laying up a laminate comprising pre-consolidated composite material;
   positioning the laminate in mold tooling;
   placing a plurality of spoke hole pins through the laminate prior to consolidation in locations corresponding to the desired location of spoke holes in the rim;
   consolidating the laminate under heat and pressure;
   removing the rim from the mold tooling;
   removing the spoke hole pins from the rim; and
   wherein a plurality of alignment features are formed on the mold tool, each feature of the plurality corresponding to a spoke hole channel of the plurality of spoke hole channels and wherein said placing a plurality of spoke hole pins through the laminate further comprises (a) placing an end of the spoke hole pins on a spoke hole insertion tool, (b) keying the spoke hole insertion tool to an alignment feature, and pressing the spoke hole pin through the laminate using the tool.

2. The method of claim 1, wherein said consolidating includes curing a thermosetting matrix resin.

3. The method of claim 1, wherein (i) the mold tooling substantially encapsulates or surrounds the laminate when assembled around the laminate preceding said consolidating operation, (ii) said positioning the laminate in the mold tooling further includes placing a bladder in a circumferential cavity formed by the laminate and (iii) said consolidating includes inflating the bladder to apply pressure to the laminate.

4. The method of claim 3, wherein the spoke hole pins each include an elongated cylindrical projection and a head having a top surface and a generally convexly shaped bottom surface that intersects with the cylindrical projection, and wherein the bladder upon inflation applies pressure to each pin through the top surface.

5. The method of claim 1, wherein the mold tool includes a plurality of spoke hole channels formed on the tool to receive the spoke hole pins therein.

6. The method of claim 1, wherein the left and right sides of the consolidated rim each include molded-in raised braking surfaces, and wherein the method further comprises abrading each braking surface by placing the braking surface against an abrasive paper or cloth secured to a surface table, and moving the rim relative to the surface table while applying pressure to hold the surface in contact with the table.

7. The method of claim 1 wherein said consolidating further comprises heating the mold tooling containing the pre-consolidated laminate to an elevated temperature while applying pressure.

8. The method of claim 1, wherein said placing the plurality of spoke hole pins includes urging reinforcement fibers of the laminate immediately adjacent to and surrounding the plurality of spoke holes to curve around the periphery of the spoke holes to remain continuous.

9. The method of claim 8, wherein the fibers immediately adjacent to and surrounding the spoke hole to curve around the periphery of the spoke hole to remain continuous in the circumferential direction of the rim.

10. The method of claim 8, wherein the fibers immediately adjacent to and surrounding the spoke hole to curve around the periphery of the spoke hole to remain continuous in the radial direction of the rim.

11. The method of claim 1, further comprising:
   creating the laminate by layering plies; and
   wherein said placing the plurality of spoke hole pins includes positioning fibers of the laminate around each of the spoke holes to curve around the edge of the spoke hole to maintain continuity of the fibers.

12. The method of claim 1, wherein said placing the plurality of spoke hole pins includes pushing the spoke hole pins through the laminate to urge fibers to extend around the edges of the spoke holes.

13. The method of claim 1, wherein the spoke hole channels are evenly spaced around an interior circumference of the mold tooling.

14. The method of claim 1, wherein said consolidating includes curing a thermosetting matrix resin.

15. The method of claim 1, wherein said consolidating includes applying pressure to the laminate via a bladder.

16. The method of claim 1, further comprising:
forming a valve stem hole by positioning fibers of the laminate to curve around the edge of the valve stem hole to maintain continuity of the fibers.

17. The method of claim 1, further comprising:
wherein the spoke hole pins each include a convex underside; and
molding concave depressions around the spoke holes by pressing the convex undersides of the spoke hole pins against the laminate during said consolidation.

18. The method of claim 17, further comprising:
inserting a nipple having a rounded end into one of the concave depressions; and
securing a spoke to the nipple with the spoke extending through one of the spoke holes.

19. A method of fabricating a bicycle rim, comprising:
assembling first and second clam shells together to form mold tooling, wherein the clam shells when assembled together define opposing sides of a shell relief portion and a plurality of spoke pin channels extending radially inward from an interior circumferential edge of the shell relief portion, wherein the spoke pin channels are positioned at the desired location of spoke holes in the rim;
laying up a laminate substantially comprising an epoxy and carbon fiber prepreg;
positioning the laminate in the shell relief portion of the mold tooling;
inserting in locations corresponding to the desired location of the spoke holes in the rim a plurality of spoke hole pins through the laminate prior to consolidation without causing appreciable damage to the continuity of the carbon fibers surrounding each spoke hole, wherein said inserting includes extending the spoke hole pins into the spoke pin channels;
placing a bladder in a circumferential cavity formed by the laminate;
inflating the bladder to apply pressure to the laminate;
heating the mold tooling and laminate to cure the laminate while the spoke hole pins extend into the spoke pin channels;
removing the rim from the mold tooling;
removing the bladder from an interior of the rim; and
removing the spoke hole pins from the rim.

20. The method of claim 19, wherein said inserting includes urging carbon fibers of the prepreg immediately adjacent to and surrounding the plurality of spoke holes to curve around the periphery of the spoke holes to remain continuous.

21. The method of claim 19, wherein the spoke hole pins each include an elongated cylindrical projection and a head having a top surface and a generally convexly shaped bottom surface that intersects with the cylindrical projection, and wherein the bladder upon inflation applies pressure to each pin through the top surface.

22. The method of claim 19, further comprising:
fabricating a raised braking surface on the rim; and
minimizing planarity variations of the braking surface by abrading the braking surface.

23. The method of claim 19, wherein:
said laying includes layering plies of the laminate; and
said inserting includes positioning the fibers of the laminate around each of the spoke holes to curve around the edge of the spoke hole to maintain continuity of the fibers.

24. The method of claim 19, wherein said inserting includes pushing the spoke hole pins through the laminate to urge fibers to extend around the edges of the spoke holes.

25. The method of claim 24, wherein the fibers curve around the edges of the spoke hole to remain continuous in the circumferential direction of the rim.

26. The method of claim 24, wherein the fibers curve around the edges of the spoke hole to remain continuous in the radial direction of the rim.

27. The method of claim 19, further comprising:
forming a valve stem hole by positioning fibers of the laminate to curve around the edge of the valve stem hole to maintain continuity of the fibers.

28. The method of claim 19, further comprising:
wherein the spoke hole pins each include a convex underside; and
molding concave depressions around the spoke holes by pressing the convex undersides of the spoke hole pins against the laminate during said inflating the bladder.

29. The method of claim 28, further comprising:
inserting a nipple having a rounded end into one of the concave depressions; and
securing a spoke to the nipple with the spoke extending through one of the spoke holes.

30. The method of claim 19, wherein said inserting includes inserting the spoke hole pins with an insertion tool.

31. The method of claim 30, further comprising:
aligning the spoke hole pins with the spoke pin channels by engaging the insertion tool with an alignment structure of the mold tooling.

32. A method, comprising:
creating a laminate by layering plies inside a mold with an interior cavity shaped to form a rim;
wherein the mold includes a plurality of spoke pin channels extending radially inward at positions corresponding to spoke holes of the rim;
wherein the spoke pin channels are aligned with one another to extend within a plane;
inserting spoke hole pins through the laminate to position fibers of the laminate around the spoke holes to curve around the edges of the spoke holes to maintain continuity of the fibers, wherein said inserting the spoke hole pins through the laminate includes inserting the spoke hole pins with an insertion tool;
aligning the spoke hole pins with the spoke pin channels by engaging the insertion tool with an alignment structure of the mold;
inserting the spoke hole pins into the spoke pin channels;
consolidating the plies to form the rim; and
retaining the spoke hole pins at the positions corresponding to the spoke holes with the spoke pin channels during said consolidating.

33. The method of claim 32, wherein the spoke pin channels are evenly spaced around an interior circumference of the interior cavity of the mold.

34. The method of claim 32, wherein said consolidating includes curing a thermosetting matrix resin.

35. The method of claim 32, wherein said consolidating includes applying pressure to the plies via a bladder.

36. The method of claim 35, wherein the spoke hole pins each include an elongated cylindrical projection and a head having a top surface and a generally convexly shaped bottom surface that intersects with the cylindrical projection, and wherein the bladder upon inflation applies pressure to each pin through the top surface.

37. The method of claim 32 further comprising:
forming a valve stem hole by positioning the fibers to curve around the edge of the valve stem hole to maintain continuity of the fibers.

38. The method of claim 32, further comprising:
wherein the spoke hole pins each include a convex underside; and
molding concave depressions around the spoke holes by pressing the convex undersides of the spoke hole pins against the plies during said consolidation.

39. The method of claim 38, further comprising:
inserting a nipple having a rounded end into one of the concave depressions; and
securing a spoke to the nipple with the spoke extending through one of the spoke holes.

40. The method of claim 32, further comprising:
fabricating a raised braking surface on the rim; and
minimizing planarity variations of the braking surface by abrading the braking surface.

41. The method of claim 32 wherein said consolidating further comprises heating the mold to an elevated temperature while applying pressure.

\* \* \* \* \*